June 17, 1947.   A. G. DEAN   2,422,397
ENGINE MOUNT
Filed Sept. 30, 1944   4 Sheets-Sheet 1

INVENTOR
ALBERT G. DEAN
BY John P. Tarbox
ATTORNEY

June 17, 1947.  A. G. DEAN  2,422,397
ENGINE MOUNT
Filed Sept. 30, 1944  4 Sheets-Sheet 2

INVENTOR
ALBERT G. DEAN
BY John P. Tarbox
ATTORNEY

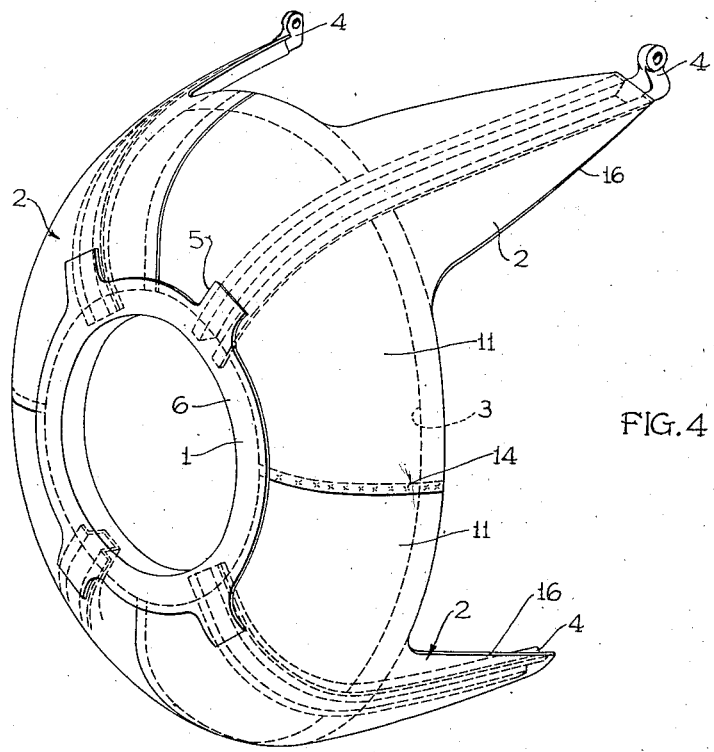
FIG. 4
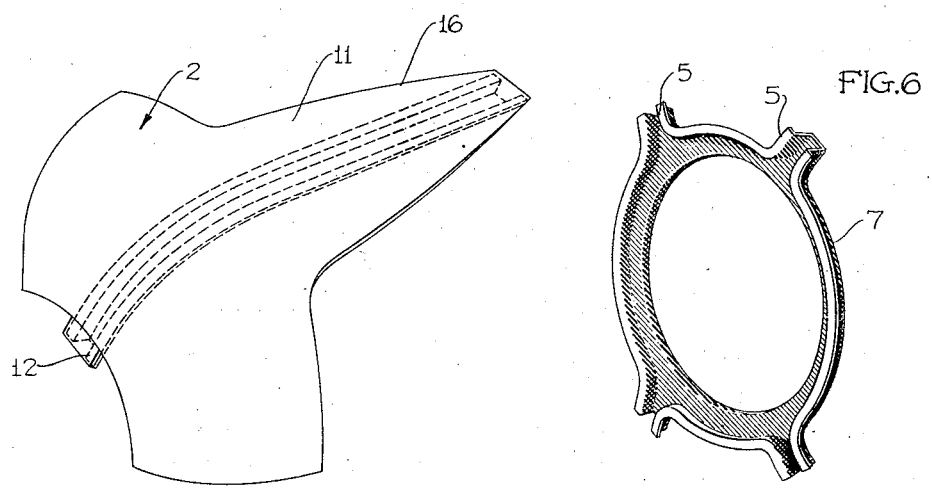
FIG. 5
FIG. 6
INVENTOR
ALBERT G. DEAN
BY John P. Tarbox
ATTORNEY June 17, 1947. A. G. DEAN 2,422,397
ENGINE MOUNT
Filed Sept. 30, 1944 4 Sheets-Sheet 4
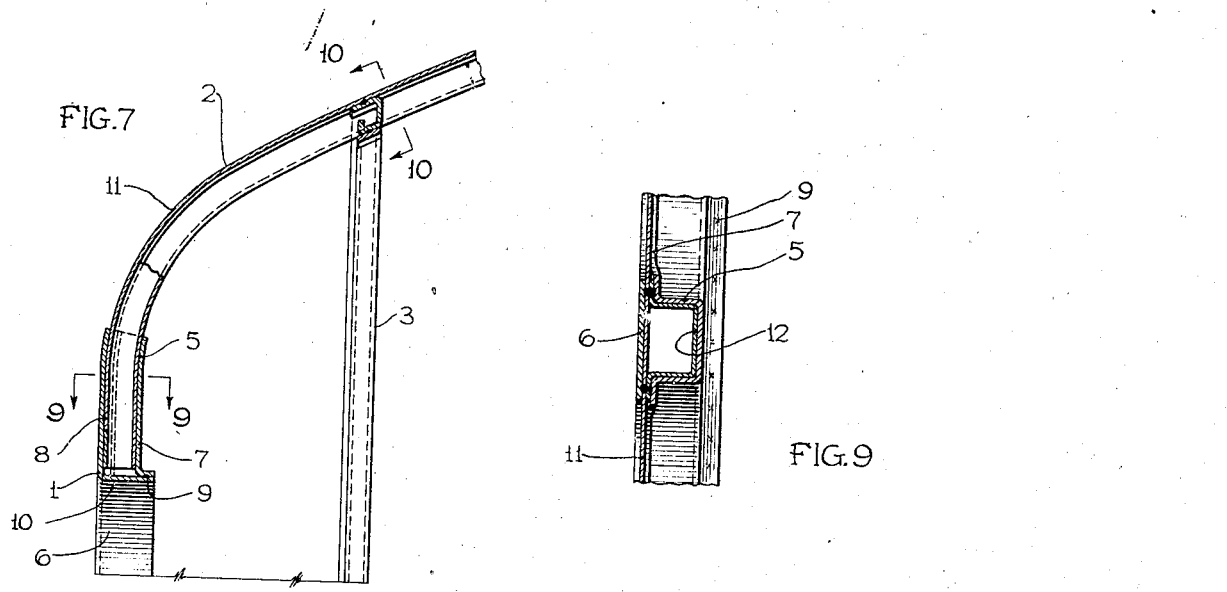
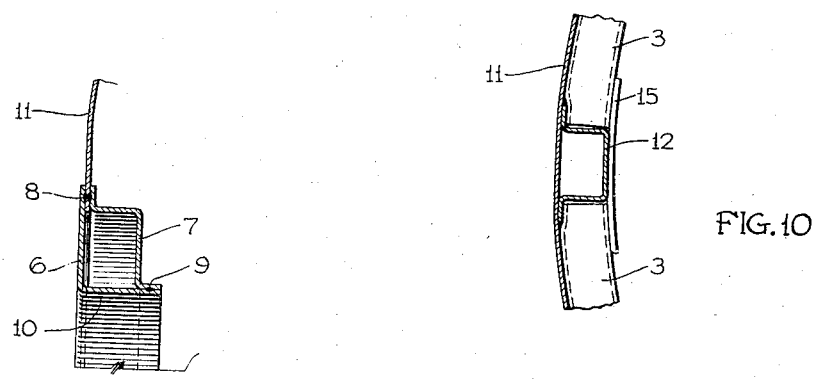
INVENTOR
ALBERT G. DEAN
BY John P. Tarbox
ATTORNEY Patented June 17, 1947

2,422,397

UNITED STATES PATENT OFFICE 2,422,397

ENGINE MOUNT

Albert G. Dean, Narberth, Pa., assignor to The Budd Company, Philadelphia, Pa., a corporation of Pennsylvania Application September 30, 1944, Serial No. 556,538

7 Claims. (Cl. 248—5)

This invention relates to a semi-monocoque cantilever engine mount and has for an object the provision of improvements in this art.

The principal object of the present invention is to simplify the structure and its fabrication while retaining all or most of the advantages of the prior construction.

The above and other objects and advantages of the invention will be apparent from the following description of an exemplary embodiment thereof, reference being made to the accompanying drawings, wherein:

Fig. 4 is a perspective view of the mount alone;

Fig. 5 is a perspective view of a portion of the mount before final assembly;

Fig. 6 is a perspeective view of a ring stamping;

Fig. 7 is an enlarged partial section taken on the line 7—7 of Fig. 2;

Fig. 8 is a further enlarged partial section taken on the line 8—8 of Fig. 2;

Fig. 9 is an enlarged section taken on the line 9—9 of Fig. 7; and

Fig. 10 is an enlarged section taken on the line 10—10 of Fig. 7.

Figure 1:
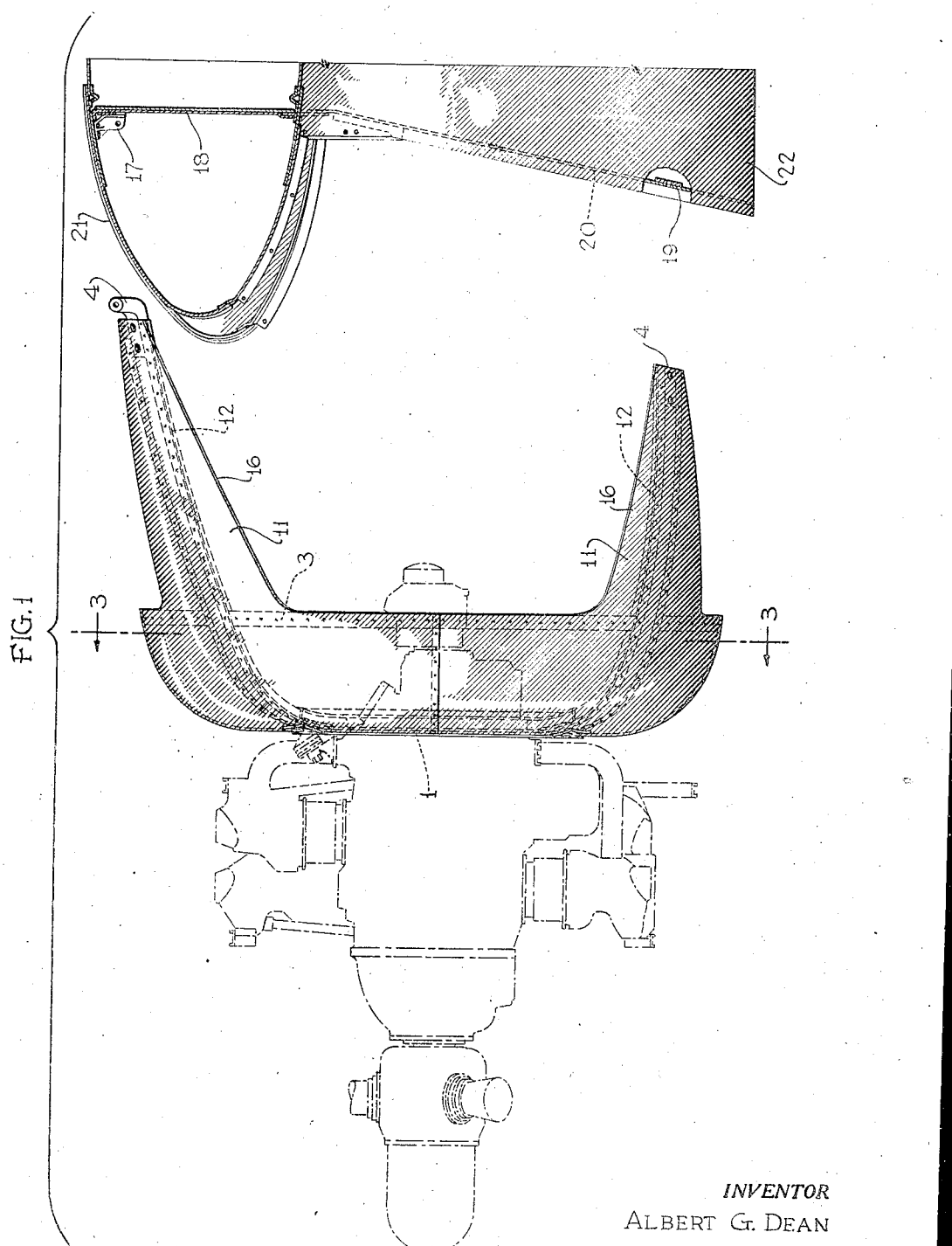
Fig. 1 is a side elevation of the mount and the associated wing and nacelle structure to which it is to be attached.
Figure 2:
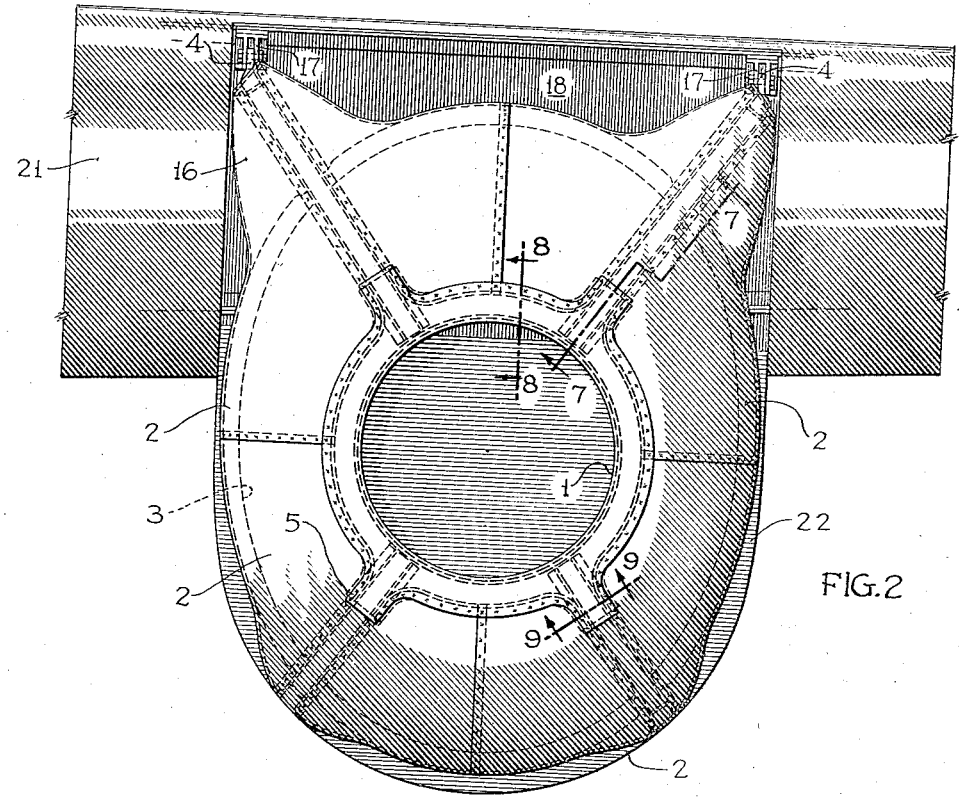
Fig. 2 is a front elevation of the mount as secured to the wing and nacelle.
Figure 3:
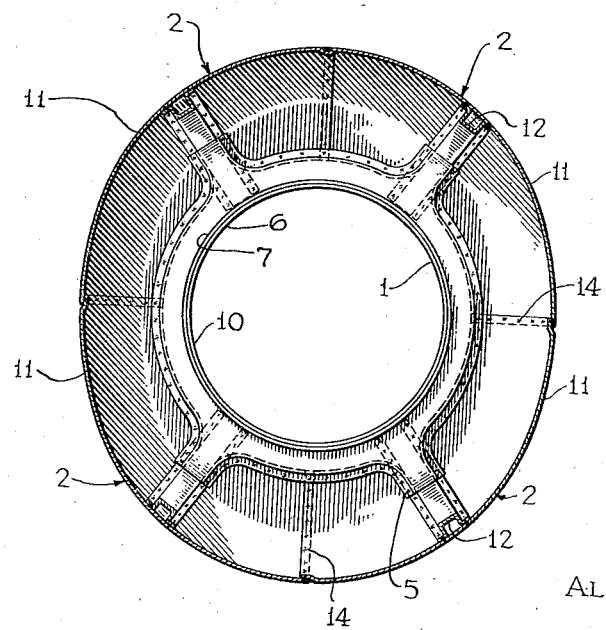
Fig. 3 is a transverse section, somewhat reduced in size, taken on the line 3—3 of Fig. 1.

The mount comprises as main sub-assemblies, a mounting ring 1, four arm assemblies 2 secured to the ring and to each other, and several curved stiffener band elements 3. To the rear ends of the arm assemblies 2 there are secured anchorage members 4 of a suitable nature. The arcuate frame members or stiffeners 3 extend from the circumferential mid-portion of one arm assembly to the next, crossing their joint line and assisting to tie them together as well as to strengthen and rigidify the assembly. The several curved stiffeners together form a circular frame band element.

The ring 1 includes a plurality of stub arms 5, one for the mid-portion of each arm assembly. The ring is preferably formed of two mating oppositely disposed angle-shaped stampings 6, 7 which are welded together through their flanges at opposite corners, as at 8, 9 in Fig. 8. One pair of overlapping welded flanges extends rearwardly from the interior opening 10 of one stamping 6 and the other pair extends radially outward from the front surface of the stamping.

The arm assemblies 2 each comprises a shaped sheet metal skin sheet 11 and a stiffener rib 12 welded thereto at the mid-portion. The skin sheet and the stiffener rib are curved to the desired shape, being sharply curved at the front end and straighter toward the rear end. Each stiffener rib 12 matches with the end of a stub arm 5 and is secured thereto. Preferably the rib is socketed in the arm. The skin sheet 11 is welded to the ring 1, as to the outer flanges 13 thereof, and at the side edges is welded to an adjacent sheet as at 14. At the rear edges the skin sheets 11 are provided with stiffening flanges and means for securing closure sheets, not shown.

The stiffening ring elements 3 are welded to the skin sheets 11 and at their ends to the sides of the ribs 12. Bridging splicers 15 (Fig. 10) may be welded in at the ribs 12.

From the central opening 10 back to the band formed by the curved stiffener band elements 3, the skin sheets form a full closure; but behind this there are spaced extensions 16 separated by open spaces which provide ample access to the interior wherein engine service lines and accessories are disposed. The openings are covered by removable closures (not shown).

The mount is secured to upper fittings 17 on a spar 18 and to lower fittings 19 on a bulkhead 20. The spar comprises part of a wing 21 and the bulkhead comprises part of a nacelle 22 secured below the wing. The engine 23 is shown in dotted lines in Fig. 1. The ring 1 is provided with suitable holes for anchoring the engine but these are omitted in the drawings.

The hockey stick-shaped ribs are very easy to make and assemble with the pre-shaped skin sheets 11. The ends of the ribs and skin sheets are secured between the ring elements 6 and 7 and welded together. Then the edges of the sheets are welded together along their overlapping edges at 14. The band elements 3 may then be attached.

It is thus seen that the parts are very few in number and simple in form. The manufacture is very easy and few jigs are required. The completed structure is light but very strong and well adapted to absorb the twist, thrust and bending forces imposed by the engine.

While one embodiment has been described to illustrate the invention, it is to be understood that there may be various embodiments within the limits of the prior art and the scope of the subjoined claims.

What is claimed is:

1. A cantilever semi-monocoque engine support, comprising a mounting ring having a plurality of outwardly projecting stub socket arms, and a plurality of rib assemblies, each comprising a stiffener rib extending outwardly and rearwardly and a skin sheet secured to said ring, with the stiffener ribs aligned with and forming continuations of said stub arms, the skin sheets being secured together along their meeting edges between ribs.

2. A cantilver semi-monocoque engine support, comprising a mounting ring having a plurality of outwardly projecting stub socket arms, and a plurality of rib assemblies, each comprising a stiffener rib extending outwardly and rearwardly and a skin sheet secured to said ring, with the stiffener ribs aligned with and forming continuations of said stub arms, the skin sheets being secured together along their meeting edges between ribs, said ring being formed in box section of two mating angle section flanged sheet metal ring elements.

3. A cantilever semi-monocoque engine support, comprising a mounting ring having a plurality of outwardly projecting stub socket arms, and a plurality of rib assemblies, each comprising a stiffener rib extending outwardly and rearwardly and a skin sheet secured to said ring, with the stiffener ribs aligned with and forming continuations of said stub arms, the skin sheets being secured together along their meeting edges between ribs, said ring being formed of a plurality of mating sheet metal stampings having one pair of outstanding connected flanges extending axially rearward around a central opening and another pair of outstanding connected flanges extending radially outward from the front surface of the ring.

4. A cantilever semi-monocoque engine support, comprising a mounting ring formed of shaped sheet metal elements and including a plurality of stub arms, a plurality of rib assemblies secured to said mounting ring and to each other, each rib assembly including a stiffening rib secured to a stub arm and extending outwardly and rearwardly therefrom and a skin sheet secured to the rib and to the front of said mounting ring, and a circumferential stiffening band secured to said rib assemblies behind said mounting ring.

5. An engine mount as set forth in claim 4, further characterized by the fact that said ring, band and ribs are formed of sheet metal and are of box section.

6. An engine mount as set forth in claim 4, further characterized by the fact that said stiffening ring is formed of a plurality of pieces which are secured along their sides to a part of the rear edges of the skin sheets and at their ends are secured to the sides of said ribs.

7. An engine mount comprising a mounting ring, a plurality of hockey stick-shaped spider ribs secured to said ring and extending outwardly and rearwardly therefrom, the ribs being of simple curvature along their length so as to be disposed in radial axial planes, and a segmental skin sheet of double curvature secured to each rib at its inner end, said sheets being secured together between ribs.

ALBERT G. DEAN.

REFERENCES CITED

The following references are of record in the file of this patent:

UNITED STATES PATENTS

| Number | Name | Date |
| --- | --- | --- |
| 2,372,905 | McKinnie | Apr. 3, 1945 |
| 2,153,388 | Newman | Apr. 4, 1938 |
| 1,860,444 | Woolson | May 31, 1932 |
| 2,359,822 | Boss | Oct. 10, 1944 |

FOREIGN PATENTS

| Number | Country | Date |
| --- | --- | --- |
| 381,781 | Great Britain | Oct. 13, 1932 |